US012489667B2

United States Patent
Benardos et al.

(10) Patent No.: US 12,489,667 B2
(45) Date of Patent: Dec. 2, 2025

(54) SHARDED SDN CONTROL PLANE WITH AUTHORIZATION

(71) Applicant: Google LLC, Mountain View, CA (US)

(72) Inventors: Benjamin John Benardos, Sunnyvale, CA (US); Anshuman Gupta, Sunnyvale, CA (US); Alok Kumar, Fremont, CA (US); Anjin Guo, San Jose, CA (US); Ujjwal Jain, San Jose, CA (US)

(73) Assignee: Google LLC, Mountain View, CA (US)

( * ) Notice: Subject to any disclaimer, the term of this patent is extended or adjusted under 35 U.S.C. 154(b) by 393 days.

(21) Appl. No.: 17/532,207

(22) Filed: Nov. 22, 2021

(65) Prior Publication Data

US 2023/0164021 A1  May 25, 2023

(51) Int. Cl.
*H04L 41/04* (2022.01)
*H04L 9/40* (2022.01)
*H04L 41/042* (2022.01)

(52) U.S. Cl.
CPC ............ *H04L 41/042* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 8,830,823 B2 | 9/2014 | Koponen et al. | |
| 9,137,107 B2 * | 9/2015 | Koponen | H04L 41/0813 |
| 9,450,817 B1 * | 9/2016 | Bahadur | H04L 41/0806 |
| 9,819,540 B1 | 11/2017 | Bahadur et al. | |
| 9,948,553 B2 | 4/2018 | Kwak et al. | |
| 10,193,749 B2 * | 1/2019 | Hira | G06F 11/1438 |
| 10,841,208 B2 | 11/2020 | Zhang | |
| 10,972,352 B2 * | 4/2021 | Harneja | G06F 16/258 |
| 2005/0240658 A1 * | 10/2005 | Schulke | H04L 67/60 |
| | | | 709/217 |
| 2014/0280738 A1 * | 9/2014 | Kolker | H04L 12/46 |
| | | | 709/218 |
| 2014/0371880 A1 * | 12/2014 | Lee | H04L 41/342 |
| | | | 700/20 |
| 2015/0139238 A1 * | 5/2015 | Pourzandi | H04L 41/40 |
| | | | 370/392 |

(Continued)

FOREIGN PATENT DOCUMENTS

| CN | 107682321 A * | 2/2018 | ......... H04L 63/0815 |
|---|---|---|---|
| EP | 3229413 A1 | 10/2017 | |

(Continued)

OTHER PUBLICATIONS

Extended European Search Report for European Patent Application No. 22189002.3 dated Apr. 17, 2023. 8 pages.

*Primary Examiner* — Kodzovi Acolatse
(74) *Attorney, Agent, or Firm* — Lerner David LLP

(57) ABSTRACT

Aspects of the disclosure are directed to a software defined network (SDN) having a sharded control plane. The SDN may include a host device and a sharded control plane. The sharded control plane may include a first controller and a second controller sharded by one or more dimensions. The first controller and the second controller may be configured to process requests received from the first host device based on their respective sharded one or more dimensions. The one or more dimensions may be networks or functions.

8 Claims, 9 Drawing Sheets

(56) References Cited

U.S. PATENT DOCUMENTS

| | | | |
|---|---|---|---|
| 2015/0309818 A1* | 10/2015 | Lee | H04L 49/70 |
| | | | 718/1 |
| 2016/0150448 A1* | 5/2016 | Perras | H04W 48/18 |
| | | | 455/450 |
| 2018/0063086 A1* | 3/2018 | Hira | G06F 11/0709 |
| 2019/0020656 A1* | 1/2019 | Arjun | H04L 63/0892 |
| 2020/0252322 A1 | 8/2020 | Houyou | |
| 2020/0344119 A1* | 10/2020 | Jiang | H04L 41/40 |
| 2020/0344120 A1* | 10/2020 | Pianigiani | H04L 41/0806 |
| 2021/0011780 A1* | 1/2021 | Wan | G06F 9/5083 |
| 2022/0321382 A1* | 10/2022 | Sridhar | H04L 45/586 |
| 2022/0329540 A1* | 10/2022 | Tangirala | H04L 45/02 |
| 2023/0104568 A1* | 4/2023 | Miriyala | H04L 41/0813 |
| | | | 718/104 |
| 2023/0254183 A1* | 8/2023 | Sridhar | H04L 49/25 |
| | | | 370/389 |

FOREIGN PATENT DOCUMENTS

| | | | | |
|---|---|---|---|---|
| WO | WO-2017138851 A1 * | 8/2017 | | |
| WO | WO-2017152754 A1 * | 9/2017 | ............. | H04L 29/06 |
| WO | 2020112448 A1 | 6/2020 | | |

* cited by examiner

SHARDED SDN CONTROL PLANE WITH AUTHORIZATION

BACKGROUND

A software defined network (SDN) is a networking architecture that relies on a separate controller to configure and manage network resources. In this regard, SDNs typically include a data plane and a control plane. The data plane, which may include network devices, such as routers, switches, access points (APs), etc., is managed by a software controller in the control plane. By moving control of the network devices to the control plane, management of networks is more flexible since the network devices may be managed virtually through the control plane. However, as the size of SDNs continue to increase, management of the SDN by the controller may be slow. Further, managing the SDN through a single controller may become burdensome.

BRIEF SUMMARY

The technology described herein is directed to scaling a software defined network with a sharded control plane. One aspect of the technology is directed to a software defined network (SDN) system, comprising a first host device executing at least one virtual machine and a shard control plane. The first host device may be on a first virtual network. The shared control plane may include a first controller and a second controller sharded by one or more dimensions, wherein the first controller and the second controller are configured to process requests received from the first host device based on their respective sharded one or more dimensions.

In some examples, the first dimension of the first controller is the first virtual network; and the second dimension of the second controller is a second virtual network.

In some instances, the first host device is programmed by the first controller to access the second virtual network.

In some instances, the first host device is configured to request access to the second virtual network from the second controller.

In some instances, after receiving the request, the second controller verifies that the first host device is authorized to access the second virtual network.

In some instances, verifying that the first host device is authorized to access the second virtual network includes: requesting, by the second controller from the first controller, an authentication verification; and receiving, by the second controller from the first controller, the authentication verification.

In some instances, after verifying the first host device is authorized to access the second virtual network, programming the first host device by the second controller to enable access to the second virtual network.

In some instances, programming the first host device by the second controller to enable access to the second virtual network includes providing one or more of: a physical IP address for a host device on the second virtual network; a virtual IP address for a virtual machine executing on the host device on the second virtual network; or a token granting access to the second virtual network.

In some examples, the first dimension of the first controller is the first function, and the second dimension of the second controller is a second function. In some instances, processing requests from the first host device includes: programming the first host device with the first function, wherein the first function is chained to the second function.

Another aspect of the disclosure is directed to a method for controlling data flow in a software defined network (SDN). The method may include, sharding, by one or more processors, controllers on a control plane of the SDN, wherein the sharding comprises: assigning, by the one or more processors, a first controller to a first dimension; and assigning, by the one or more processors, a second controller to a second dimension.

In some instances, the first dimension of the first controller is a first virtual network; and the second dimension of the second controller is a second virtual network.

In some examples, the method includes, programming, by the first controller, a first host device to access the second virtual network.

In some examples, the method includes, requesting, by the first host device, access to the second virtual network from the second controller.

In some instances, the method includes, after receiving the request, the second controller, verifies that the first host device is authorized to access the second virtual network.

In some examples, verifying that the first host device is authorized to access the second virtual network includes: requesting, by the second controller from the first controller, an authentication verification; and receiving, by the second controller from the first controller, the authentication verification.

In some instances, the method includes, after verifying the first host device is authorized to access the second virtual network, programming, by the second controller, the first host device to enable access to the second virtual network.

In some instances, programming the first host device by the second controller to enable access to the second virtual network includes providing one or more of: a physical IP address for a host device on the second virtual network; a virtual IP address for a virtual machine executing on the host device on the second virtual network; or a token granting access to the second virtual network.

In some instances, the first dimension of the first controller is the first function, and the second dimension of the second controller is a second function.

In some examples, processing requests from the first host device includes: programming the first host device with the first function, wherein the first function is chained to the second function.

DETAILED DESCRIPTION

Aspects and implementations of the present disclosure generally relate to scaling a software defined network ("SDN") control plane by sharding the SDN controllers ("controllers"). In this regard, each controller may be sharded by one or more dimensions, such as by function or virtual network identifier. Each sharded controller may then contain the state for each dimension it was assigned. For example, the controllers of the control plane may be sharded by function and each sharded controller may contain the state for each function it is assigned during the sharding. Similarly, each controller may be sharded by virtual network identifier, such that each sharded controller may have the state for the virtual network identifier or subset of virtual networks it was assigned. In other examples, controllers may be sharded by both network identifiers and functions.

The functions offered by a sharded control plane, such as firewalls, routing, network address translation (NAT), etc., may be managed by different controllers. By sharding the control plane by function, functionalities of the network may be more easily scaled and made more readily available. For example, when new functionalities are to be added, new controllers may be added to the control plane to handle the new functions. Further, by splitting the various functionalities amongst controllers it may be easier to quickly release updates to particular functions without interrupting other network functionalities. For instance, to update a firewall configuration, the controller assigned the firewall function may be temporarily out of service, but other services provided by the control plane may remain functional. As used herein, the term "function" may include any service that may be managed or provided by an SDN.

Each sharded controller may have only partial information about a part of the network associated with the dimension it was assigned. For instance, a sharded controller assigned a function may only include information about the particular assigned function. In another example, a sharded controller assigned a particular network may only include information about that particular assigned network. The sharded controllers may program SDN nodes, such as host devices, with this partial information, such that the SDN node can communicate with the correct controller when a function or network is needed. The sharded controllers may also provide nodes with instructions for where to pull remaining information, as described further herein. Further, the sharded controllers may authenticate and control access to the function and/or network to which it is sharded through an authorization protocol, as described further herein.

Figure 1:
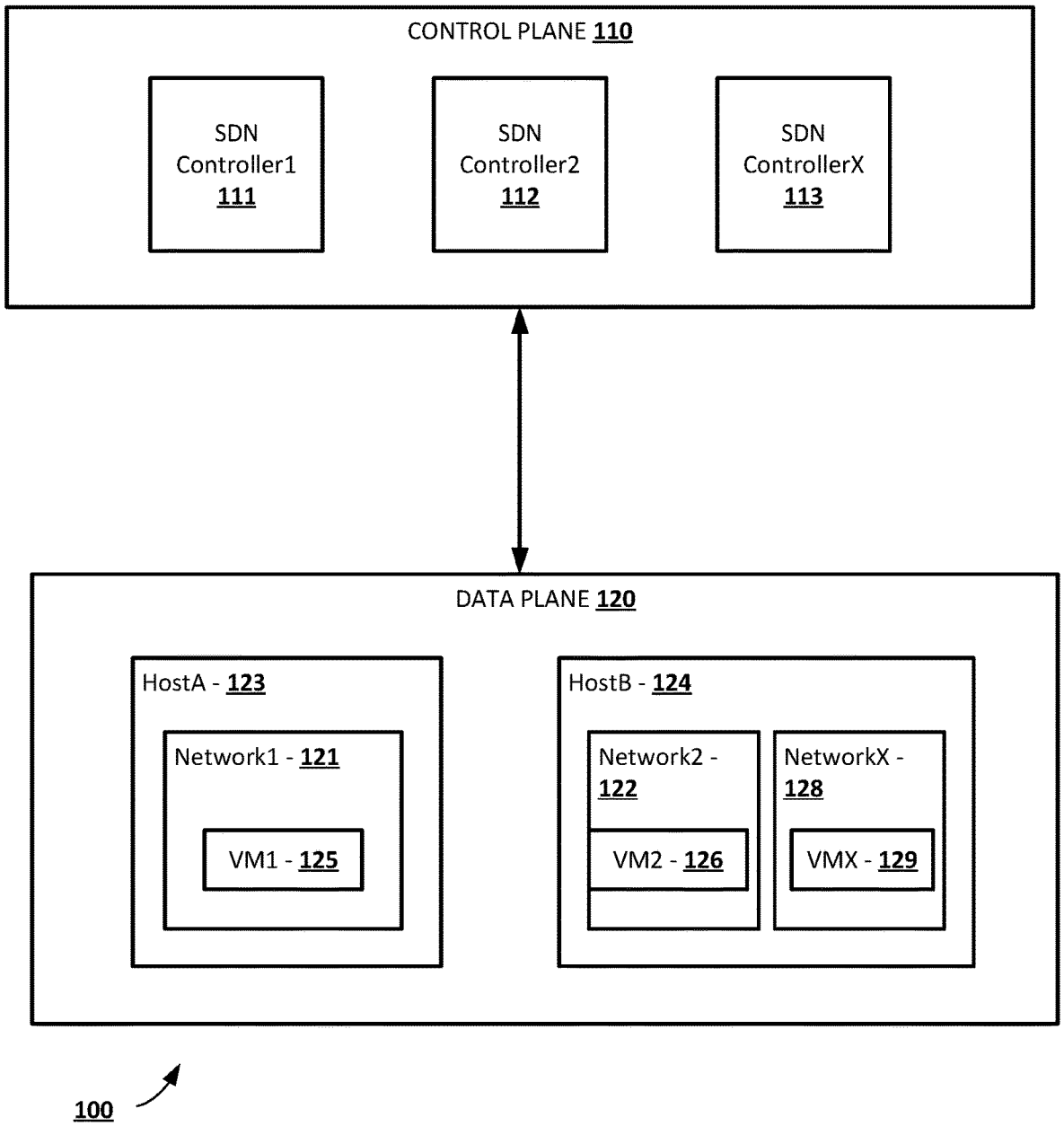
FIG. 1 illustrates an example software defined network in accordance with aspects of the disclosure.

FIG. 1 illustrates an example software defined network 100. SDN 100 includes a control plane 110 and a data plane 120. The data plane is configured to carry data packets through the various networks. The data plane includes networks, including Network1 121, Network2 122, and NetworkX 128. Although only three networks are shown, there may be any number of networks. Each network may also include one or more network devices (not shown,) such as routers, switches, access points (APs), hubs, bridges, etc. It will be understood that references to "network devices" may include "host devices," unless otherwise stated. Network1 121, Network2 122, and NetworkX 128 may each be virtual networks comprised of network devices located at the same and/or different locations. Further, each network may include any number of computing devices, such as end-user computers.

The host devices 123, 124 may be any computing device, such as general purpose computers, servers, etc. As further illustrated in FIG. 1, each host device may execute one or more virtual machines, with HostA 123 executing virtual machine VM1 125 and HostB 124 executing virtual machines VM2 126 and VMX 129. Although each host device 123, 124 are illustrated as each executing one or two virtual machines, host devices may execute any number of virtual machines.

As further shown in FIG. 1, each virtual machine may be part of a network. In this regard, VM1 125 is on virtual Network1 121, VM2 126 is on virtual Network2 122, and VMX 129 is on virtual Network X 128. Although each virtual machine is shown as being on a different virtual network, each virtual network may include any number of virtual machines.

Within the control plan are SDN controllers 111-113 (each referred to herein as a "controller".) The control plane, and the controllers 111-113 contained therein, may each be connected to the data plane 120 via a wired and/or wireless connection. Similarly, network devices in the data plane 120 may be connected together via a wired and/or wireless connection. In this regard, each network device in the data plane 120 may link other devices, such as other network devices or hosts, together. Although FIG. 1 illustrates control plane 110 with three controllers 111-113, a control plane may include any number of controllers.

In some instances, the controllers 111-113 may each be configured to control functions or operations of one or more networks. For instance, Controller1 111 may maintain Network1 121 and Controller2" may maintain Network2 122. The controllers may be computing devices linked to the network devices by control plane 110. In some examples, the controllers may be implemented as virtual machines and/or physical computing devices. In some implementations, each controller 111-113 may be configured to communicate and exchange data with other controllers, as described in greater detail herein.

Figure 2:
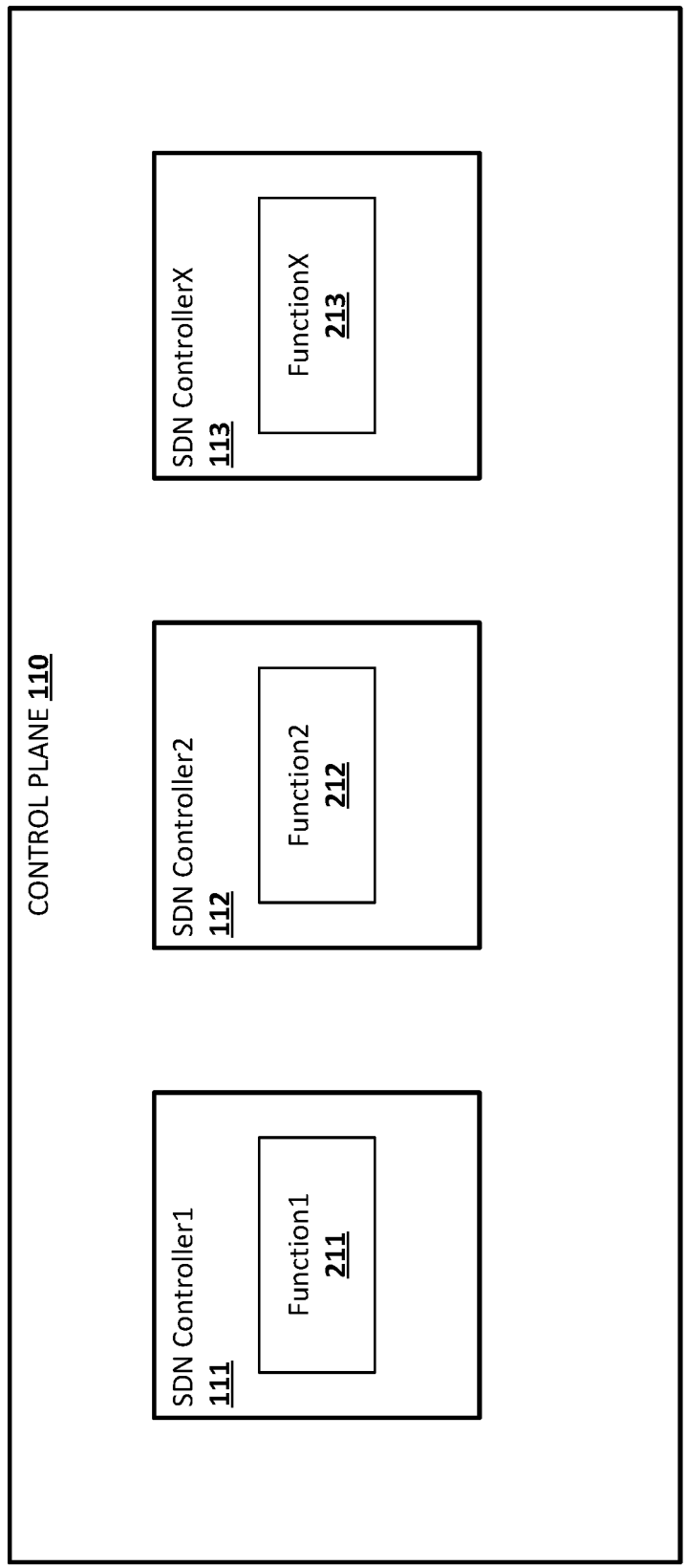
FIG. 2 illustrates an example of SDN controllers sharded by function, in accordance with aspects of the disclosure.

FIG. 2 illustrates an example in which SDN controllers 111-113 sharded by function. In this regard, SDN Controller1 111 is assigned to handle Function1 211, SDNController2 112 is assigned to handle Function2 212, and SDN ControllerX is assigned to handle FunctionX. Although not shown, each controller may be assigned to handle more than one function. Further, each controller may be configured to control a particular network or collection of networks. For instance, SDN Controller1 may be assigned to handle Function1 211 for a particular network or collection of networks.

Sharding of the SDN controllers 111-113 may be done by a user or automatically by a computing device. For instance, a user, such as a network administrator, may shard each controller such that it is assigned one or more functions. In another example, a computing device may be programmed to automatically (or at the request of a user) assign functions to each controller.

Figure 3:
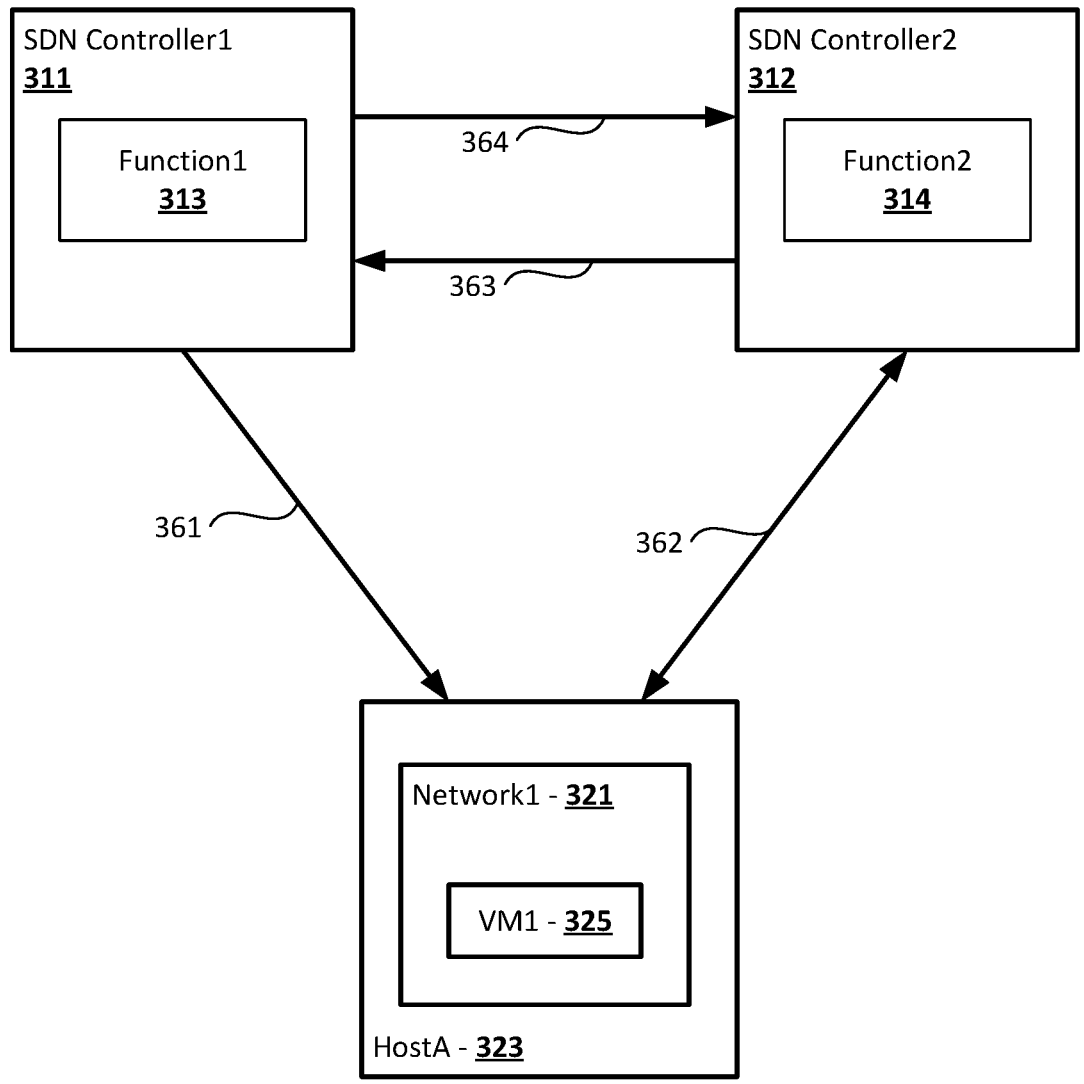
FIG. 3 illustrates an example SDN in which SDN controllers are sharded by function, in accordance with aspects of the disclosure.

FIG. 3 illustrates an SDN with a sharded control plane, wherein one controller SDN Controller1 311 is assigned to handle Function1 313 and SDN Controller2 312 is assigned to handle Function2 314. Both controllers 311, 312 are configured to handle network traffic on Network1 321. In FIG. 3 SDN Controlled sends control plane programming to HostA 323, as illustrated by line 361. The control plan programming is for Function1 313 managed by SDN Controller1 311. The programming for Function1 313 is dependent on Function2 314, which is managed by SDN Controller2 312. In this scenario, Function1 313 is said to be "chained" with Function2 314.

After HostA 323 receives the programming from SDN Controller1, HostA 323 may request Function2 314 from SDN Controller2 312, as illustrated by line 362. After SDN Controller2 312 receives the request for Function2, SDN Controller2 312 may request authorization from SDN Controller1 311 to provide the requested function to HostA 323, as illustrated by line 363.

In response to the authorization request, SDN Controller1 311 may provide (or not provide) authorization, as illustrated by line 364. In the event SDN Controller 1 311 provides authorization, SDN Controller2 312 may provide Function2 314 to HostA 323, as further illustrated by line 362. Otherwise, SDN Controller2 312 may not provide Function2 314.

In systems where hosts and/or virtual machines need to communicate across networks, there may be considerations for authorizations. In particular, if a host and/or virtual machine on a first network tries to communicate with a network device on a second network, the controller(s) responsible for the second network should verify that the host and/or virtual machine on the first network is authorized to access the second network. To do so, the controllers may communicate directly and/or through intermediary controllers. For example, communication from one controller may be direct to another controller. In another example, communication from one controller may be routed through other controllers to the intended recipient controller. The controller for the second network may request authorization from the controller for the first network, which manages and is aware of the devices on the first network. Each controller may be considered secure and trustworthy. As such, information shared between the controllers may be considered truthful and accurate.

For authentication, a controller that receives a request from a device (e.g., host device and/or virtual machine,) for access to the network managed by the controller, may request authorization from the controller managing the network on which the requesting device is. In response to the authorization request, the controller of the network on which the requesting device is located may provide authorization, with details of the granularity of the authorization. Example details of the granularity of the authorization may include the host IP and/or attributes of the virtual machine (e.g., the virtual machine IP.)

Upon receiving authorization, the controller receiving the request may program the requesting device with the necessary information to communicate on the network. For instance, the controller may provide IP addresses for devices the requesting device may communicate with.

Figure 4:
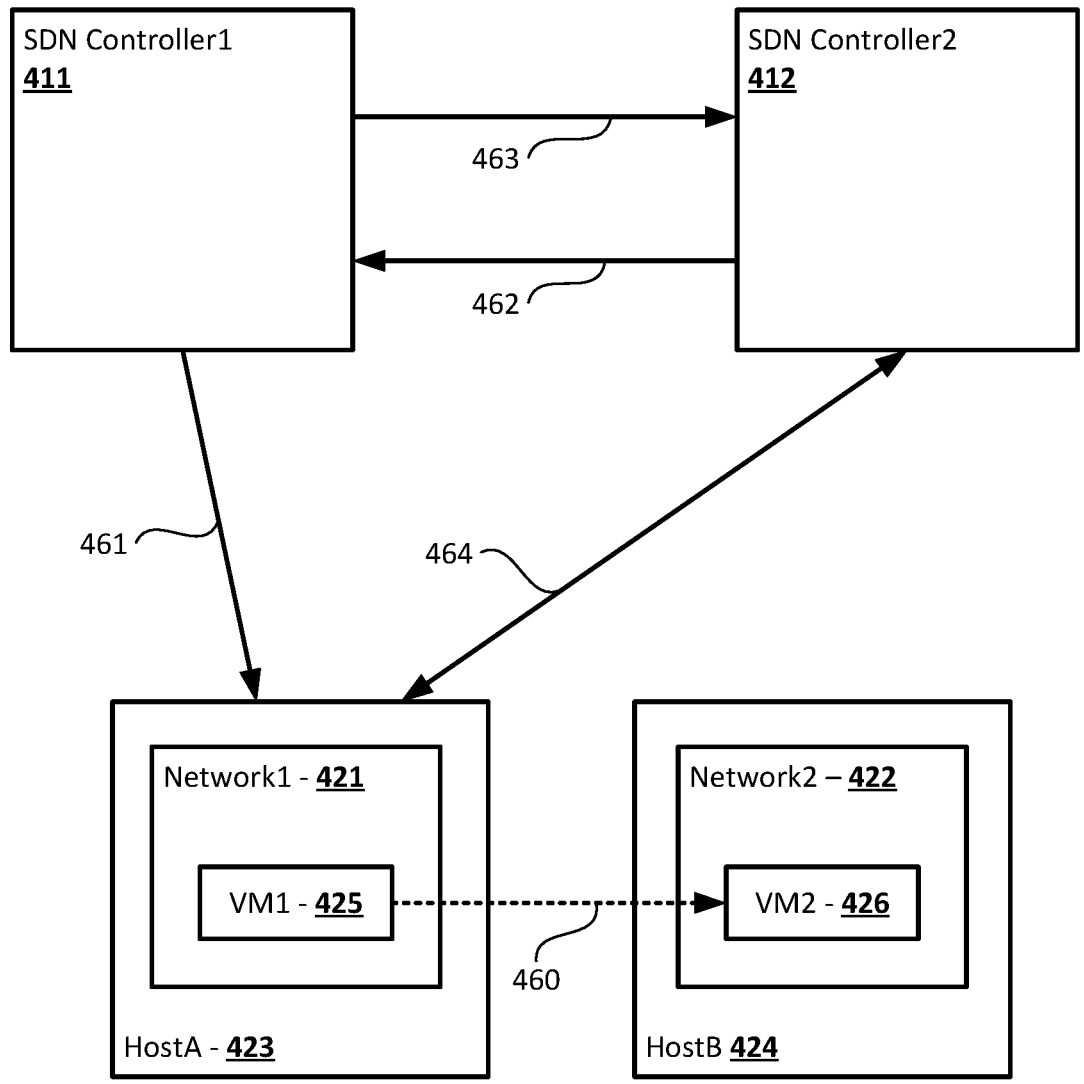
FIG. 4 illustrates an example SDN and data flow in which SDN controllers are sharded by network, in accordance with aspects of the disclosure.

FIG. 4 illustrates an example of cross-network communication. In particular, FIG. 4 illustrates controllers, SDN Controller1 411 and SDN Controller2 412. These controllers are sharded such that each controls a virtual network. In this regard, SDN Controller1 411 controls virtual Network1 421 and SDN Controller2 412 controls virtual Network2 422. As further shown in FIG. 4, HostA 423, executing virtual machine (VM1) 425 is on virtual Network1 421. HostB 424, executing virtual machine (VM2) 426 is on virtual Network2 422. As illustrated by dashed line 460, VM1 425 is attempting to connect with VM2 426.

The reason for VM1 425 attempting to connect with VM2 426 may be due to SDN Controller1 411 programming HostA 423 with programming that depends on VM2 426 within Network2 422. This programming of HostA 423 by SDN Controller1 411 is illustrated by line 461. Example programming may include, for example, if Network1 421 is peered with Network2 422, VM1 425 can send packets to VM2 426. In this example, and as further illustrated in FIG. 4, SDN Controller1 411 programming, illustrated by line 461, may include the IP address of VM2. As further illustrated by line 464, HostA 423 may request, from SDN Controller2 412, the host address where VM2 426 resides. As further detailed below, SDN Controller2 may, in response to the request and after receiving authorization, provide the identity of HostB 424 to HostA 423.

To enable cross-network communication between VM1 425 and VM2 426, HostA 423 may request programming from SDN Controller2 412, as illustrated by line 462. In response to the request, SDN Controller2 412 may verify with SDN Controller1 411 whether VM1 425 is authorized to access Network2 422. In the event SDN Controller1 411 indicates that VM1 425 is authorized, as illustrated by line 463, SDN Controller1 411 may provide details of the granularity of the authorization. SDN Controller2 412 may then program HostA 423 with the information required to access Network2 422, such as the physical IP address of HostB 424 and the virtual IP address of VM2 426, as shown by line 464. In some instances, SDN Controller2 412 may also provide a token to HostA 423 for use during communication with Network2 422 to for antispoofing.

In the event SDN Controller1 411 indicates that VM1 425 is not authorized, SDN Controller2 411 may not respond to the request sent by HostA 423. Alternatively, the SDN Controller2 411 may send a response indicating that either HostA 423 and/or VM1 425 are not authorized to access Network2 422.

Figure 5:
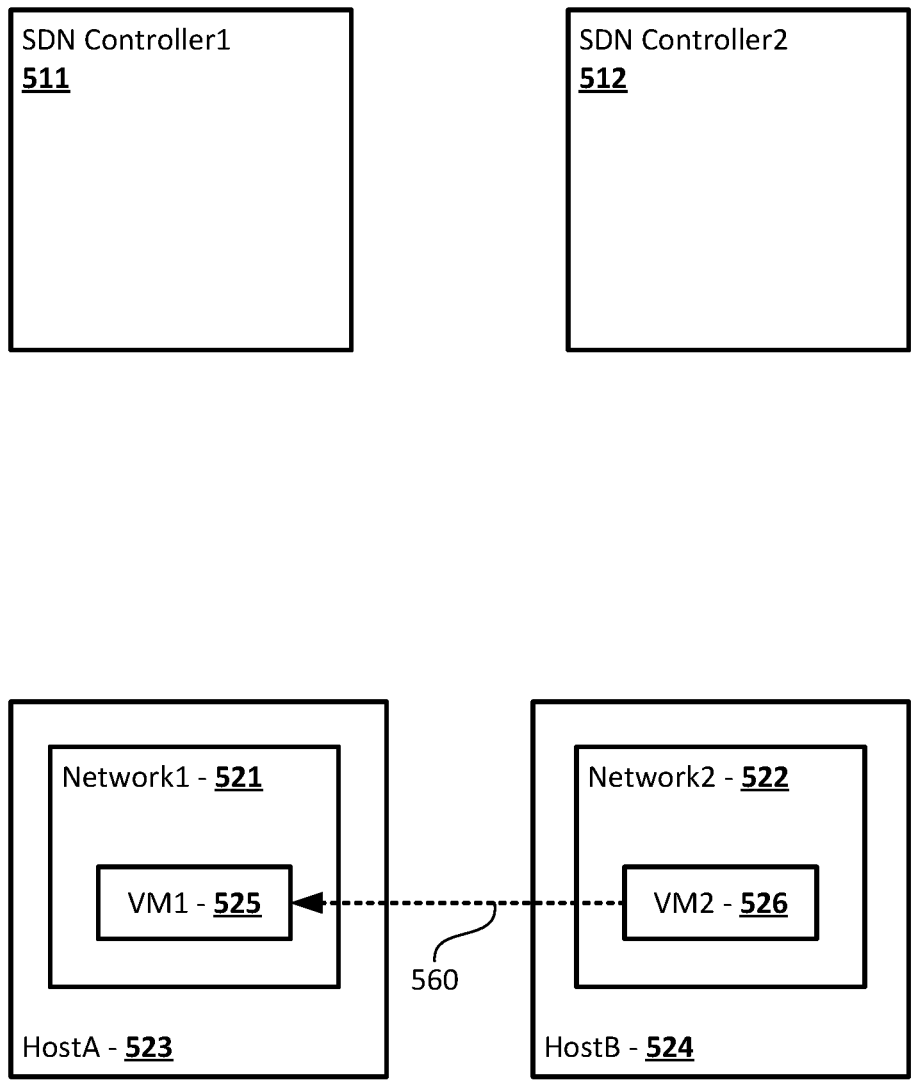
FIG. 5 illustrates an example SDN in which virtual machines are attempting cross-network communication, in accordance with aspects of the disclosure.

FIG. 5 illustrates another example of cross-network communication. In particular, FIG. 5 illustrates controllers, SDN Controller1 511 and SDN Controller2 512. These controllers are sharded such that each controls a virtual network. In this regard, SDN Controller1 511 controls virtual Network1 521 and SDN Controller2 512 controls virtual Network2 522. As further shown in FIG. 5, HostA 523, executing virtual machine (VM1) 525 is on virtual network Network1 521. HostB 524, executing virtual machine (VM2) 526 is on virtual network Network2 522. As illustrated by dashed line 560, VM2 526 is attempting to connect with VM1 525.

Figure 6:
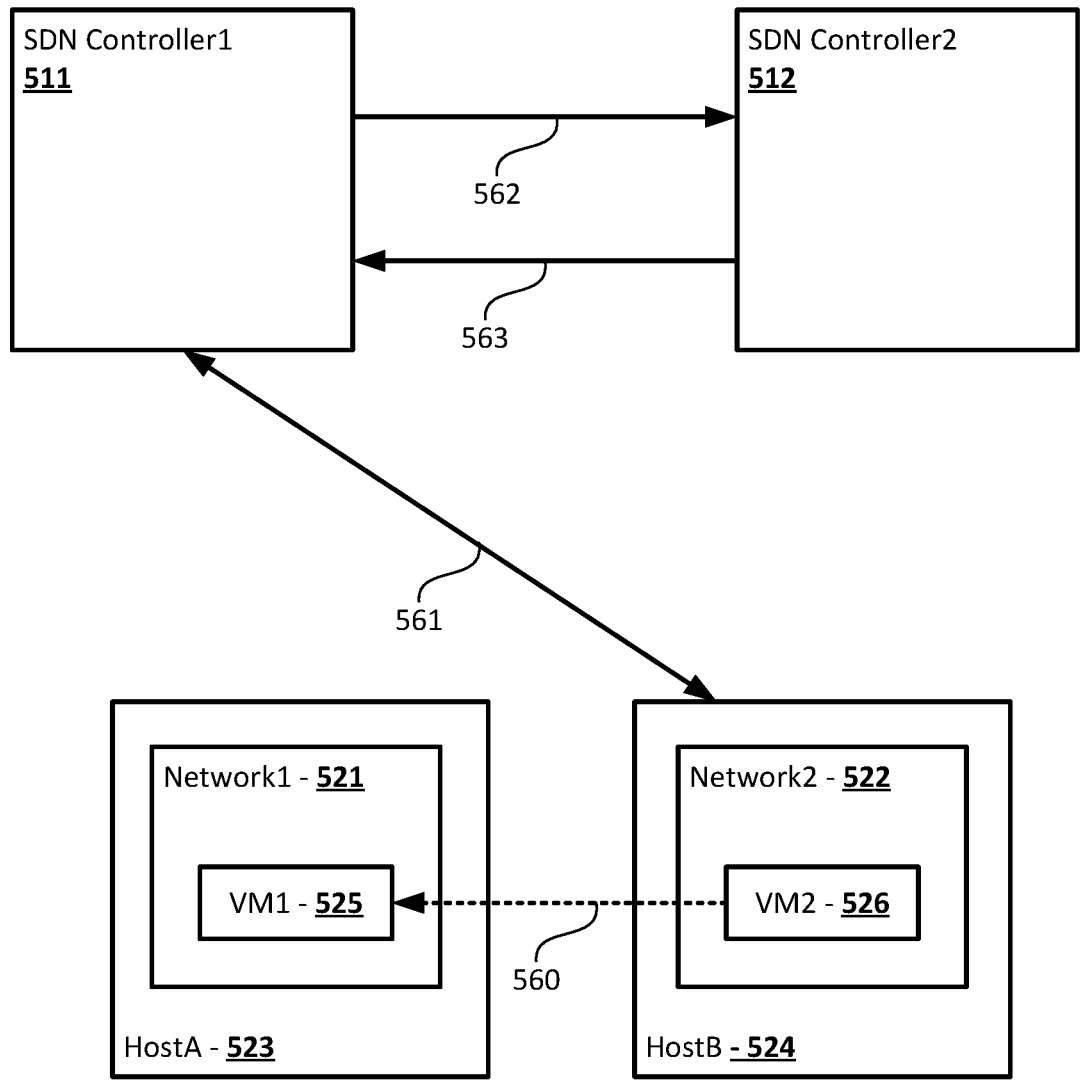
FIG. 6 illustrates additional data flow in the example SDN of FIG. 6, in accordance with aspects of the disclosure.

As shown in FIG. 6, cross-network communication between VM1 525 and VM2 526 may be enabled by HostB 524 requesting programming from SDN Controller1 512, as illustrated by line 561.

In response to the request, SDN Controller1 512 may verify with SDN Controller2 511 whether VM2 526 is authorized to access Network1 521, as illustrated by line 562. In the event SDN Controller2 512 indicates that VM2 526 is authorized, as illustrated by line 563, SDN Controller2 512 may provide details of the granularity of the authorization to SDN Controller1 511. SDN Controller1 511 may then program HostB 524 with the information required to access Network1 521, such as the physical IP address of HostA 523 and the virtual IP address of VM1 525, as further shown by line 561.

In the event SDN Controller2 512 indicates that VM2 526 is not authorized, SDN Controller1 511 may not respond to the request sent by HostB 524. Alternatively, the SDN Controller1 511 may send a response indicating that either HostB 5241 and/or VM1 526 are not authorized to access Network1 521.

Figure 7:
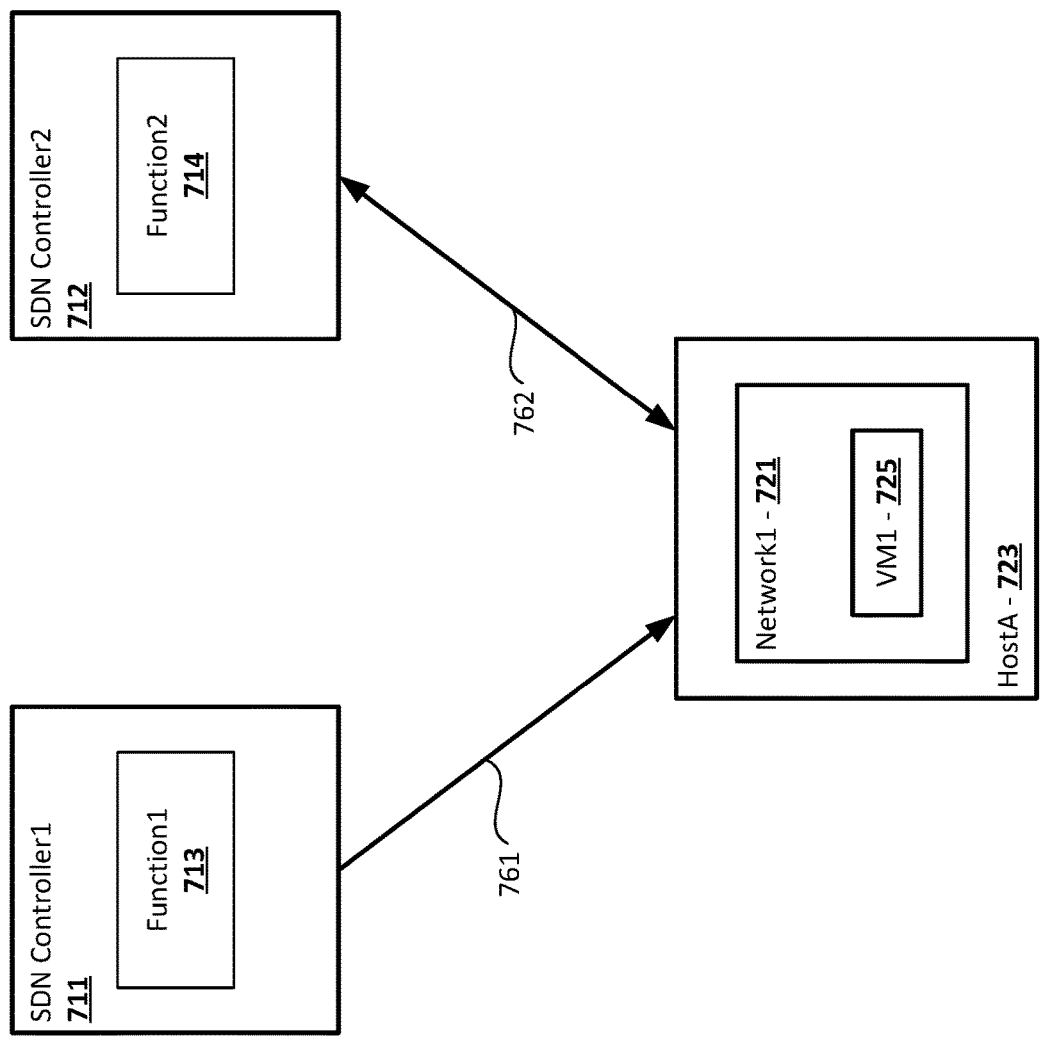
FIG. 7 illustrates another example SDN in which SDN controllers are sharded by function, in accordance with aspects of the disclosure.

FIG. 7 illustrates an SDN with a sharded control plane, wherein one controller SDN Controller1 711 is assigned to handle Function1 713 and SDN Controller2 712 is assigned to handle Function2 714. However, unlike prior examples, the controllers of the control plane, including SDN Controller1 711 and SDN Controller2 712 are not configured to communicate directly with each other. To facilitate authorization for a function or network by a controller, a token signature may be used. Token signatures may be any style of asymmetric encryption digital signature. By using token signatures, a controller may verify that a host device has permission without needing to communicate with the controller that provided the token signature. Additionally, the controller receiving the token signature is not required to trust the requesting host.

Referring again to FIG. 7, SDN Controller1 sends control plane programming to HostA 723, as illustrated by line 761. The control plan programming is for Function1 713 managed by SDN Controller1 711. The programming for Function1 713 is dependent on Function2 714, which is managed by SDN Controller2 712. In this scenario, Function1 713 is said to be "chained" with Function2 714. In addition to the programming, SDN Controller1 711 also provides a token signature with the chained Function2 714.

After HostA 723 receives the programming from SDN Controller1, HostA 723 may request Function2 714 from SDN Controller2 712, as illustrated by line 762. The request for Function 2 includes the token signature. SDN Controller2 712 may perform a validation process on the received token signature. If the validation process determines the token signature is valid, SDN Controller 2 712 may provide Function2 714 to HostA 723, as further illustrated by line 762. Otherwise, SDN Controller2 712 may not provide Function2 714.

Example Computing Environments

Figure 8:
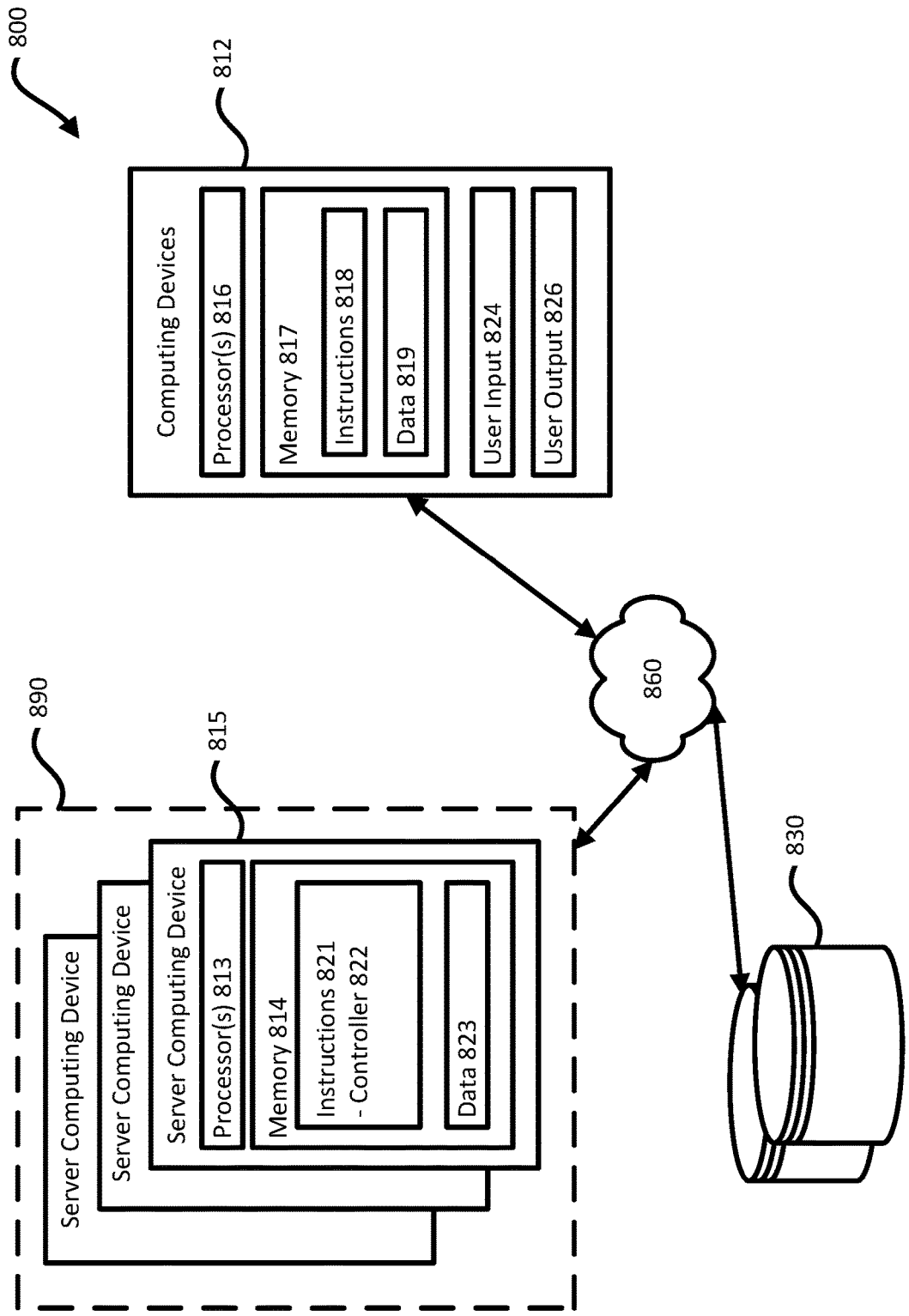
FIG. 8 is a block diagram of an example computing environment implementing the SDN, in accordance with aspects of the technology.

FIG. 8 is a block diagram of an example computing environment 800 implementing an example SDN as illustrated in FIG. 1. For example, the SDN may include one or more devices having one or more processors in one or more locations, such as in server computing device(s) 815. General or special purpose computing device 812 and the server computing device 815 can be communicatively coupled to one or more storage devices 830 over a network 860, which may include any number of virtual networks and/or physical sub-networks. The network 860 may include one or more network devices (not shown,) such as routers, switches, access points (APs), hubs, bridges, etc.

The storage device(s) 830 can be a combination of volatile and non-volatile memory, and can be at the same or different physical locations than the computing devices 812, 815. For example, the storage device(s) 830 can include any type of non-transitory computer readable medium capable of storing information, such as a hard-drive, solid state drive, tape drive, optical storage, memory card, ROM, RAM, DVD, CD-ROM, write-capable, and read-only memories. Example information stored on the storage device 830 may include state information of a networks used by controllers to manage virtual networks.

The server computing device 815 can include one or more processors 813 and memory 814, and may function as host devices. The memory 814 can store information accessible by the processor(s) 813, including instructions 821 that can be executed by the processor(s) 813. The memory 814 can also include data 823 that can be retrieved, manipulated or stored by the processor(s) 813. The memory 814 can be a type of non-transitory computer readable medium capable of storing information accessible by the processor(s) 813, such as volatile and non-volatile memory. The processor(s) 813 can include one or more central processing units (CPUs), graphic processing units (GPUs), field-programmable gate arrays (FPGAs), and/or application-specific integrated circuits (ASICs), such as tensor processing units (TPUs).

The instructions 821 can include one or more instructions that when executed by the processor(s) 813, causes the one or more processors to perform actions defined by the instructions. The instructions 821 can be stored in object code format for direct processing by the processor(s) 813, or in other formats including interpretable scripts or collections of independent source code modules that are interpreted on demand or compiled in advance. The instructions 821 can include instructions for implementing controllers 822, such as controller 111-113, and consistent with other aspects of this disclosure. The controllers can be executed using the processor(s) 813, and/or using other processors remotely located from the server computing device 815.

The data 823 can be retrieved, stored, or modified by the processor(s) 813 in accordance with the instructions 821, such as functions and network state information. The data 823 can be stored in computer registers, in a relational or non-relational database as a table having a plurality of different fields and records, or as JSON, YAML, proto, or XML documents. The data 823 can also be formatted in a computer-readable format such as, but not limited to, binary values, ASCII or Unicode. Moreover, the data 823 can include information sufficient to identify relevant information, such as numbers, descriptive text, proprietary codes, pointers, references to data stored in other memories, including other network locations, or information that is used by a function to calculate relevant data.

The computing device 812 can also be configured similar to the server computing device 815, with one or more processors 817, memory 817, instructions 818, and data 819. The computing device 812 can also include a user output 827, and a user input 824. The user input 824 can include any appropriate mechanism or technique for receiving input from a user, such as keyboard, mouse, mechanical actuators, soft actuators, touchscreens, microphones, and sensors.

The server computing device 815 can be configured to transmit data to the computing device 812, and the computing device 812 can be configured to display at least a portion of the received data on a display implemented as part of the user output 827. The user output 827 can also be used for displaying an interface between the computing device 812 and the server computing device 815. The user output 827 can alternatively or additionally include one or more speakers, transducers or other audio outputs, a haptic interface or other tactile feedback that provides non-visual and non-audible information to the platform user of the computing device 812.

Although FIG. 8 illustrates the processors 813, 817 and the memories 814, 817 as being within the computing devices 815, 812, components described in this specification, including the processors 813, 817 and the memories 814, 817 can include multiple processors and memories that can operate in different physical locations and not within the same computing device. For example, some of the instructions 821, 818, and the data 823, 819 can be stored on a removable SD card and others within a read-only computer chip. Some or all of the instructions and data can be stored in a location physically remote from, yet still accessible by, the processors 813, 817. Similarly, the processors 813, 817 can include a collection of processors that can perform concurrent and/or sequential operations. The computing devices 815, 812 can each include one or more internal clocks providing timing information, which can be used for time measurement for operations and programs run by the computing devices 815, 812.

The server computing device 815 can be configured to receive requests to process data from the computing device 812. For example, the environment 800 can be part of a computing platform configured to provide a variety of services to users, through various user interfaces and/or APIs exposing the platform services. One or more services can be a machine learning framework or a set of tools for generating neural networks or other machine learning models according to a specified task and training data. The computing device 812 may receive and transmit data specifying target computing resources to be allocated for executing a neural network trained to perform a particular neural network task.

The devices 812, 815 can be capable of direct and indirect communication over the network 860. The devices 815, 812 can set up listening sockets that may accept an initiating connection for sending and receiving information. The network 860 itself can include various configurations and protocols including the Internet, World Wide Web, intranets, virtual private networks, wide area networks, local networks, and private networks using communication protocols proprietary to one or more companies. The network 860 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 860, in addition or alternatively, can also support wired connections between the devices 812, 815, including over various types of Ethernet connection.

Although a single server computing device 815 is identified in FIG. 8, any number of server computing devices may be within the system, as illustrated by dashed box 890. Further, although only a single computing device 812 is shown in FIG. 8, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

Figure 9:
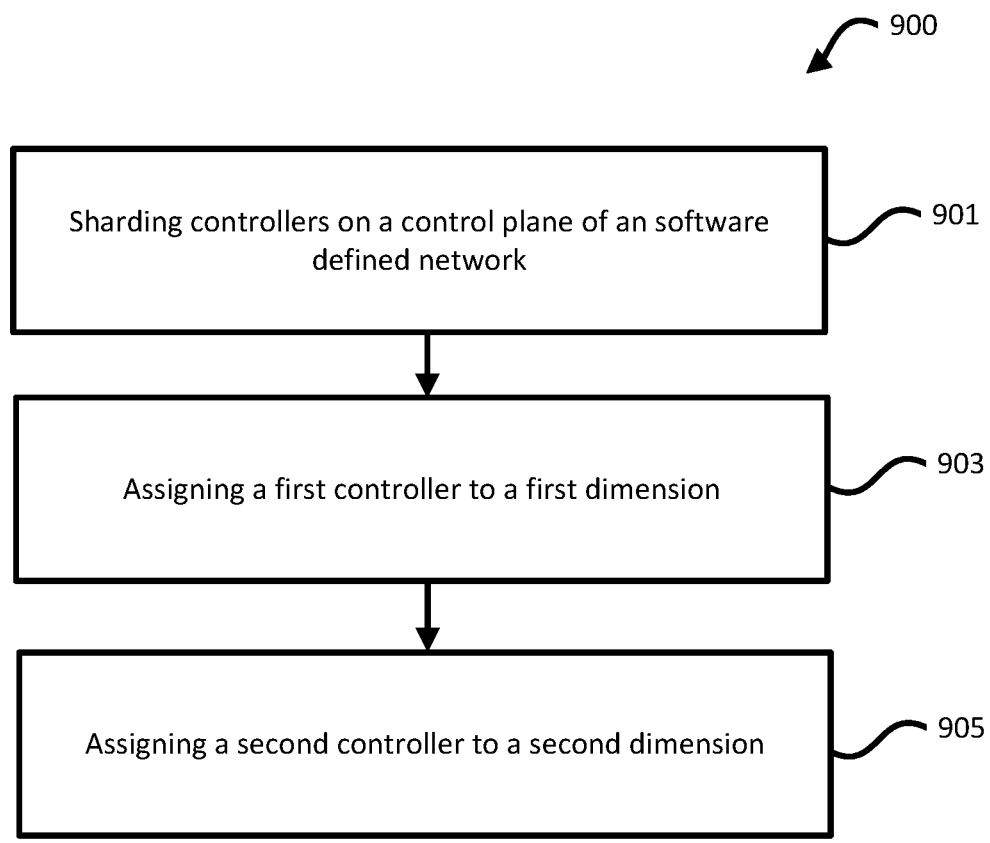
FIG. 9 is a flow diagram illustrating an example method for controlling data flow in a software defined network in accordance with aspects of the technology.

FIG. 9 is a flow diagram 900 showing an example method for controlling data flow in a software defined network. As illustrated by block 901, controllers on a control plane of the SDN may be sharded. As shown by block 903, the sharding may include assigning a first dimension to a first controller. As shown by block 905, the sharding may also include assigning a second dimension to a second controller. The first dimension and second dimension may be a function or a network. In some instances, controllers may be programmed with more than one dimension.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown and that some operations can be omitted, performed more than once, and/or be performed in parallel with other operations. Further, the separation of different system components configured for performing different operations should not be understood as requiring the components to be separated. The components, modules, programs, and engines described can be integrated together as a single system, or be part of multiple systems. One or more processors in one or more locations implementing an example controller, host, VM, etc, according to aspects of the disclosure can perform the operations shown in the drawings and recited in the claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A software defined network (SDN) system, comprising:
a first host device executing at least one virtual machine, wherein the first host device is on a first virtual network; and
a sharded control plane comprising a first controller and a second controller sharded by one or more dimensions, wherein a first dimension of the first controller is a first virtual network, and a second dimension of the second controller is a second virtual network,
wherein the first host device is configured to request, from the second controller, access to the second virtual network,
wherein the second controller, after receiving the request, verifies with the first controller that the first host device is authorized to access the second virtual network, and
wherein, after verifying with the first controller that the first host device is authorized to access the second virtual network, the first host device is programmed by the second controller to access the second virtual network.

2. The SDN system of claim 1, wherein verifying that the first host device is authorized to access the second virtual network includes:

requesting, by the second controller from the first controller, an authentication verification; and receiving, by the second controller from the first controller, the authentication verification.

3. The SDN system of claim 1, wherein after verifying the first host device is authorized to access the second virtual network, programming the first host device by the second controller to enable access to the second virtual network.

4. The SDN system of claim 3, wherein programming the first host device by the second controller to enable access to the second virtual network includes providing one or more of:

a physical IP address for a host device on the second virtual network; or a virtual IP address for a virtual machine executing on the host device on the second virtual network.

5. A method for controlling data flow in a software defined network (SDN), comprising:

sharding, by one or more processors, controllers on a control plane of the SDN, wherein the sharding comprises:

assigning, by the one or more processors, a first controller to a first dimension, wherein the first dimension of the first controller is a first virtual network; and assigning, by the one or more processors, a second controller to a second dimension, wherein the second dimension of the second controller is a second virtual network; and requesting, from the second controller by a first host device, access to the second virtual network;

after receiving the request, the second controller, verifies that the first host device is authorized to access the second virtual network; and programming, by the second controller, the first host device to access the second virtual network.

6. The method system of claim 5, wherein verifying that the first host device is authorized to access the second virtual network includes:

requesting, by the second controller from the first controller, an authentication verification; and receiving, by the second controller from the first controller, the authentication verification.

7. The method of claim 5, further comprising:

after verifying the first host device is authorized to access the second virtual network, programming, by the second controller, the first host device to enable access to the second virtual network.

8. The method of claim 7, wherein programming the first host device by the second controller to enable access to the second virtual network includes providing one or more of:

a physical IP address for a host device on the second virtual network; or a virtual IP address for a virtual machine executing on the host device on the second virtual network.

\* \* \* \* \*